US005249248A

United States Patent [19]

Arroyo et al.

[11] Patent Number: 5,249,248

[45] Date of Patent: Sep. 28, 1993

[54] COMMUNICATION CABLE HAVING A CORE WRAP BINDER WHICH PROVIDES WATER-BLOCKING AND STRENGTH PROPERTIES

[75] Inventors: Candido J. Arroyo, Lithonia; David S. Hancock, Roswell; Cecil G. Montgomery, Cumming; Wayne M. Newton, Lilburn, all of Ga.

[73] Assignee: AT&T Bell Laboratories, Murray Hill, N.J.

[21] Appl. No.: 799,491

[22] Filed: Nov. 27, 1991

[51] Int. Cl.[5] .......... G02B 6/44

[52] U.S. Cl. .......... 385/113; 385/109; 174/120 SR

[58] Field of Search .......... 385/100, 102, 104, 107, 385/113, 109; 174/120 R, 120 C, 120 SR, 110 N

[56] References Cited

U.S. PATENT DOCUMENTS

| | | | |
|---|---|---|---|
| 3,790,694 | 2/1974 | Portinari | 174/120 C |
| 4,815,813 | 3/1989 | Arroyo et al. | 350/96.23 |
| 4,867,526 | 9/1989 | Arroyo | 350/96.23 |
| 4,870,117 | 9/1989 | Levy | 523/173 |
| 4,913,517 | 4/1990 | Arroyo et al. | 350/96.23 |
| 4,963,695 | 10/1990 | Marciano-Agnostinelli et al. | 174/23 |
| 5,039,197 | 8/1991 | Rawlyk | 385/102 |
| 5,082,719 | 1/1992 | Arroyo | 385/102 X |
| 5,133,034 | 7/1992 | Arroyo et al. | 385/102 X |

OTHER PUBLICATIONS

"Waterblocking Yarns" Gela-Tapes.

"Lanseal-F Super Absorbent Fiber", Japan Exlan Co.

*Primary Examiner*—John D. Lee

*Assistant Examiner*—Stephen W. Barns

*Attorney, Agent, or Firm*—Donald E. Hayes, Jr.

[57] ABSTRACT

A communication cable (20) includes a core (22) comprising a plurality of transmission media having a relatively supple layer (26) of a plastic material wrapped thereabout. Disposed about the layer of plastic material and in engagement therewith is a relatively rigid inner plastic jacket (28). Disposed about the inner jacket are additional components of a sheath system such as metallic shields and one or more additional plastic jackets. Interposed between the relatively supple layer of plastic material and the jacket is a water-blocking system which comprises two elongated strand materials (42, 44) such as yarns. The two elongated strand materials are wrapped helically about the layer of plastic material in opposite helical directions. The elongated strand materials are characterized by being yarn blends which comprise a portion of water-blocking filaments and a portion of relatively high strength filaments. The elongated strand materials are effective to intercept water which may travel along the cable between the relatively supple layer of plastic material and the jacket which is contiguous hereto. In addition, the relatively high tensile strength of the strand materials provides additional physical support to maintain the supple plastic material tightly around the transmission media.

9 Claims, 2 Drawing Sheets

COMMUNICATION CABLE HAVING A CORE WRAP BINDER WHICH PROVIDES WATER-BLOCKING AND STRENGTH PROPERTIES

TECHNICAL FIELD

This invention relates to a communications cable having a core wrap binder which provides water-blocking and strength properties. More particularly, it relates to a communications cable which includes a yarn of sufficient tensile strength to be used as a core wrap binder and capable of preventing the longitudinal migration of water along the interior of the cable.

BACKGROUND OF THE INVENTION

In the cable industry, it is well known that changes in ambient conditions lead to differences in vapor pressure between the inside and the outside of a plastic cable jacket of a sheath system. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High moisture levels inside a cable sheath system may have a detrimental effect on the transmission characteristics of the cable.

Furthermore, water may enter the cable because of damage to the sheath system which comprises the integrity of the cable. For example, lightning or mechanical impacts may cause openings in the sheath system of the cable to occur, allowing water to move toward a core of the cable, and, if not controlled, to move longitudinally into splice closures, for example. There are some splice closures available commercially in which the cable jacket is terminated inside the closure. Hence, if water is able to travel longitudinally along the cable, it could enter the splice closure, possibly causing a degradation in transmission.

Lately, optical fiber cables have made great inroads into the communications cable market. Although the presence of water itself within an optical fiber cable is not detrimental to its performance, passage of the water along the cable interior to connection points or terminals or associated equipment inside closures, for example, may cause problems especially in freezing environments and should be prevented.

In the prior art, various techniques have been used to prevent the ingress of water through the sheath system of a cable and into the core. For example, a metallic shield which often times is used to protect a cable against electromagnetic interference is provided with a sealed longitudinal seam. However, because lightning strikes may cause holes in the metallic shield, it is not uncommon to include additional provisions for preventing the movement of water longitudinally within the cable.

Filling materials have been used to fill cable cores and atactic or flooding materials have been used to coat portions of cable sheath systems such as the outer surface of a metallic shield, for example, to prevent the movement longitudinally thereof of any water which enters the cable. Although the use of a filling material causes housekeeping problems, inhibits manufacturing line speeds because of the need to fill carefully interstices of the core and presents problems for field personnel during splicing operations, for example, it continues to be used to prevent entry of the water into the core.

Presently, many commercially available cables also include a water-swellable tape. The tape is used to prevent the travel of water through the sheath system and into the core as well as its travel longitudinally along the cable to closures and termination points, for example. Such a tape generally is laminated, including a water-swellable powder which is trapped between two cellulosic tissues. Further included may be a polyester scrim which is used to provide tensile strength for the laminated tape. Although such a tape provides suitable water protection for the cable, it is relatively expensive and thick. If the tape is too thick, the diameter of the cable is increased, thereby causing problems in terminating the cable with standard size hardware.

Another factor that must be considered with respect to a water-blocking system for a cable is the bonding of a plastic cable jacket to an underlying metallic shield. Where such adhesion is important to the performance of the cable, care must be taken not to interpose a water-blocking member therebetween which would impair the desired adhesion.

As a solution to the foregoing problems prior art systems have incorporated a water-blocking member in the form of a strip or a yarn which covers only as insubstantial portion of an inner periphery of the cable. In this way, the strip or the yarn separates only an insubstantial portion of the jacket from other portions of the sheath system. Hence, if adhesion between the jacket and the other portions of the sheath system is desired, that adhesion is not compromised by the water-blocking member. Further, such a strip or yarn is less expensive than one which covers substantially an entire inner periphery of the cable.

Further, the prior art discloses that a water-blocking member may extend linearly or helically along the cable. In an optical fiber cable in which separate strength members extend linearly within the cable, the strip or yarn may be wrapped helically about a core tube along an outer surface of which extend the strength members. In an optical fiber cable in which the strength members extend helically about the cable core, the yarn or strip extends linearly or is wrapped in a helical direction opposite to that of the strength members and is disposed between the strength members and the core. See U.S. Pat. No. 4,815,813 which issued on Mar. 28, 1989 in the names of C. J. Arroyo, H. P. Debban, Jr., and W. J. Paucke.

In the last mentioned optical fiber cable, water may travel along a helically or linearly extending channel formed along each helically or linearly extending strength member. The water is intercepted at each point at which a water-blocking yarn or strip crosses a strength member. However, in metallic conductor cables, strength is provided by the metallic conductors themselves and by metallic shields of the sheath system. In those instances, any water is not channeled along helically or linearly extending paths such as along the helically or linearly extending strength members in optical fiber cables, but rather can travel along an annularly shaped channel between adjacent components of the cable.

Another problem relates to a cable which includes an inner jacket which may be used to cover a plastic core wrap material such as Mylar® plastic, for example. If a metallic shield is contiguous to the plastic core wrap material, the core wrap material may be flooded with an atactic material for water-blocking purposes. Here again such materials as atactic flooding compounds are not popular with craftspeople who at some future time may have to reenter the cable and be faced with housekeeping problems. On the other hand, if an inner jacket is interposed between the core wrap and the metallic shield, it becomes difficult to extrude a jacket having a uniform thickness over the flooding material. Furthermore, lumps could appear in the jacket, caused by uneven masses of the underlying flooding material.

To solve the above identified problems, commonly assigned U.S. patent application Ser. No. 662,054 in the name of Arroyo, et al., discloses replacing the atactic flooding compound with two yarns helically wrapped in opposite directions around the plastic core wrap material. The arrangement, disclosed by Arroyo, allows for an inner jacket of uniform thickness to be interposed between the core wrap and the metallic shield. By replacing the flooding material with the more evenly dispensable water-blocking yarn, undesired lumps appearing in the jacket due to uneven masses of the underlying flooding material are eliminated.

A further problem which prior art cable arrangements which include a plastic core wrap material relates to the need to maintain the core wrap tightly positioned around the communication media. In order to maintain the core wrap in the desired position, a material of relatively high tensile strength is required. The existing water-blocking materials known do not exhibit the necessary tensile strength to adequately hold the plastic core wrap in place.

To date, various attempts have been made to achieve both the water-blocking capabilities desired while yet exhibiting ample tensile strength for the contemplated application. In the past, separate water-blocking yarn has been wrapped helically around the outer periphery of a relatively strong polyester yarn or in the alternative, the fibrous strength member and the superabsorbent material may be twisted together, see commonly assigned U.S. Ser. No. 662,054.

Seemingly, the prior art does not disclose a cable which is provided with a single-layered unit which not only prevents substantially the flow of water longitudinally along a cable but also exhibits sufficient tensile strength so that it may be used as a core wrap binder. What is needed and what does not appear to be available in the marketplace is a relatively high-strength cable water-blocking system which is relatively inexpensive and which does not add significantly to the diameter of the cable. Such a system should be one which is easily provided during the cable manufacturing process.

SUMMARY OF THE INVENTION

The foregoing problems of the prior art have been overcome by cables of this invention. A cable of this invention includes a core which includes at least one longitudinally extending transmission media and a layer of relatively supple plastic material which is disposed about the core. For a metallic conductor, the core may be filled with a suitable water-blocking material such as that disclosed, for example, in U.S. Pat. No. 4,870,117 which issued on Sep. 26, 1989, in the names of A. C. Levy and C. F. Tu. A relatively rigid plastic jacket is disposed about the layer of relatively flexible plastic material. In order to inhibit the flow of water longitudinally along the cable, at least one elongated strand of water-blocking materials, such as yarn, is wrapped helically about the layer of relatively supple plastic material and is interposed between the layer of relatively flexible plastic material and the jacket. Specifically, the water-blocking material is characterized by being a yarn blend comprising a portion of water-blocking filaments and a portion of relatively high strength filaments. The yarn blend as referred to herein denotes a yarn obtained when two or more staple fibers are combined in the textile process for producing spun yarns, e.g., at opening or drawing. The plastic jacket may be an inner jacket with a shield system comprising one or more metallic shields and one or more additional plastic jackets disposed about the inner jacket. Furthermore, the water-blocking capabilities may be enhanced by incorporating two yarn strands which are wrapped in opposite helical direction about the layer of relatively supple plastic material.

BRIEF DESCRIPTION OF THE DRAWING

Other objects and features of the present invention will be more readily understood from the following detailed description of specific embodiments thereof when read in conjunction with the accompanying drawings, in which.

DETAILED DESCRIPTION

Figure 1:
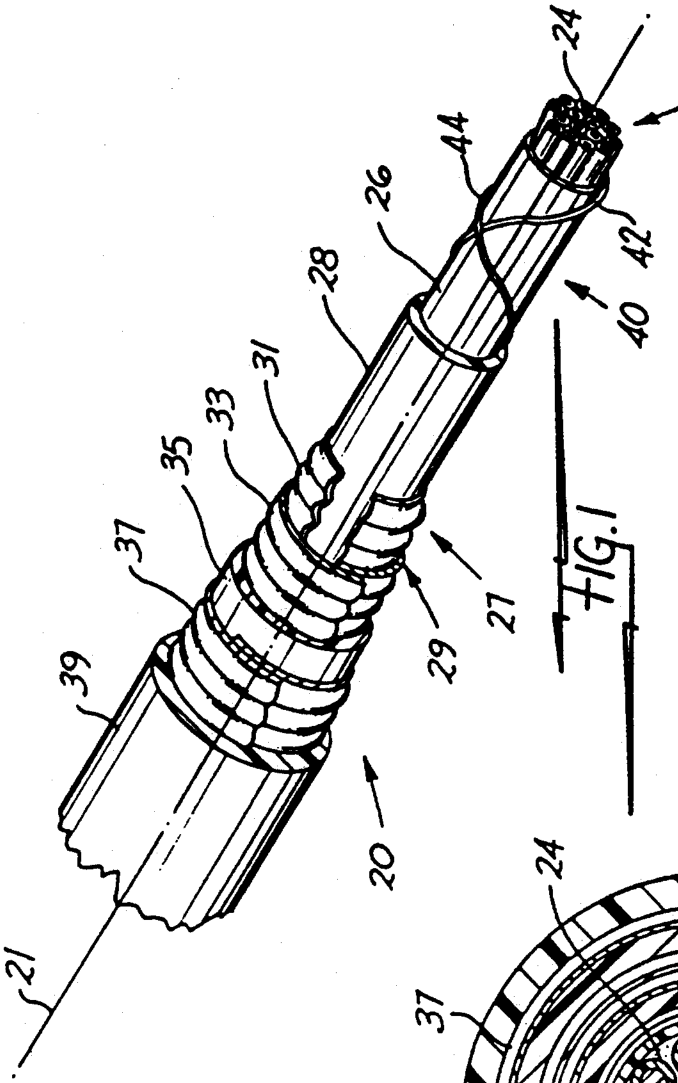
FIG. 1 is a perspective view of a communications cable having a sheath system which includes a water-blocking system with various layers of the sheath system broken away and some of the layers exaggerated in thickness for purposes of clarity.
Figure 2:
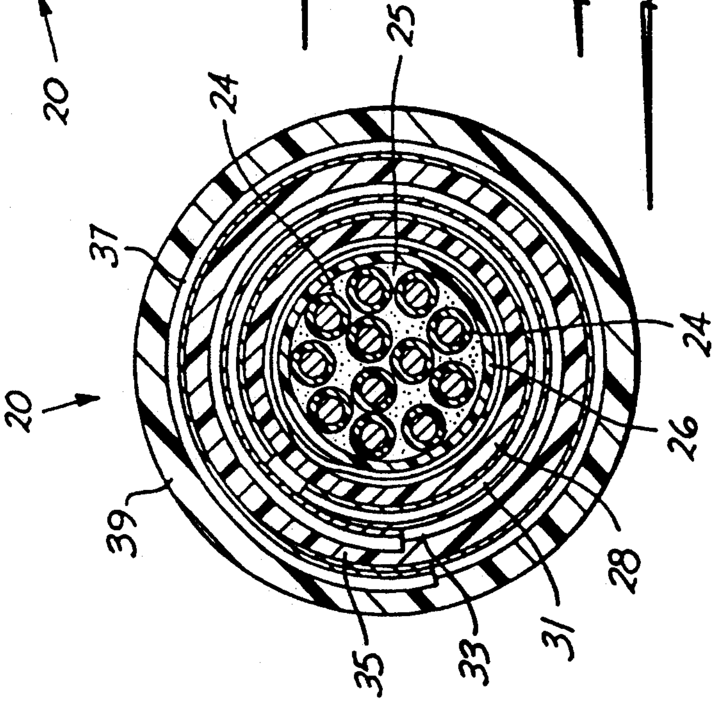
FIG. 2 is an end sectional view of the cable of FIG. 1 which illustrates some elements of the cable in greater detail.

Referring now to FIGS. 1 and 2, there is shown a communications cable which is designated generally by the numeral 20. The cable 20 has a longitudinal axis 21 and includes a core 22 comprising one or more transmission media such as one or more pairs of insulated metallic conductors 24—24 and is filled with a suitable water-blocking material 25. About the core is disposed a relatively flexible layer 26 of plastic material which often is referred to as a core wrap. Typically, the layer 26 comprises a strip of polyethylene terephthalate plastic material, for example, which has been wrapped about the core in a manner to form a longitudinally extending seam. In existing communication cables, the core wrap layer 26 is necessary to provide physical, circumferential support to maintain the plurality of transmission media in a tightly gathered bundle. Therefore, it is important that the material acting as the core wrap layer 26 have a relatively high tensile strength.

About the core wrap layer 26 is disposed a sheath system 27 which includes a relatively rigid inner jacket 28 which is made of a plastic material and which encloses the core wrap and the insulated metallic conductors. Typically the inner jacket 28 is extruded over the core wrap layer 26 and comprises polyethylene.

A corrugated inner metallic shield system 29 is disposed about the inner jacket 28. As can be seen in FIGS. 1 and 2, the inner shield system 29 comprises a corrugated aluminum shield 31 which has been wrapped longitudinally about the core to form a gapped seam, which is exaggerated for purposes of clarity in FIG. 1, and a corrugated steel shield 33 which has a longitudinal overlapped seam.

An intermediate plastic jacket 35 is disposed about the corrugated steel shield. Typically, the intermediate jacket 35 comprises polyethylene plastic material.

The sheath system 27 also includes an outer corrugated steel shield 37 having a longitudinal overlapped seam and a plastic outer jacket 39. Typically, the outer plastic jacket 39 also comprises polyethylene plastic material.

In some existing cables, additional provisions are made for preventing the flow of water longitudinally along the cable. In the cable 20, as shown in FIGS. 1 and 2, water may travel within the cable between the core wrap layer 26 and the inner jacket 28. In copending and commonly assigned application, U.S. Ser. No. 662,054, Arroyo, et al. disclose disposing a water-blocking system 40 between the core wrap layer 26 and the inner jacket 28. Such water flow is prevented substantially by causing yarns which cover only an insubstantial portion of the periphery of the core wrap layer 26 to be disposed between the core wrap layer and the inner jacket 28.

The water-blocking system 40 comprises yarns 42 and 44 (see FIG. 1), each of which includes a water-swellable material. The yarns 42 and 44, although identical in structure and composition, extend helically in opposite directions about the layer 26. In the preferred embodiment of the present invention, the wrapping is such that about three turns of each yarn are included in each meter of cable length. However, it should be noted that any well known method of physically applying the yarn around the core wrap is deemed to be a matter of design choice within the scope of this invention. Furthermore, the particular number of turns included in each meter of cable length may vary depending upon the requirements of the particular application.

In contrast to exiting communication cables, the present invention discloses the utilization of a special fiber blend of sufficient tensile strength to be used as a core wrap binder and also provides water-blocking properties which prevent the longitudinal migration of water along the interior of the cable. This inventive fiber blend incorporates filaments of threads of a water swellable fiber material as well as filaments of threads of a flexible, fibrous strength member. Therefore, the combination yarn blend is a superabsorbent yarn of high enough tensile strength so that it can be used as a core wrap binder.

In general, the Arroyo, et al. application referenced above discloses that the previously known yarns 42 and 44 may be impregnated with (1) a material comprising polyacrylic acid, (2) a material comprising polyacrylamide (3) blends of (1) and (2) or salts thereof or (4) copolymers of acrylic acid and acrylamides and salts thereof as well as other similar superabsorbent materials.

In general, the yarn blend of the present invention has increased properties which allows a single layer of yarn to replace two previously required materials. Specifically, the increased tensile strength of the yarn blend of the present invention alleviates the need for two separate and independent types of yarn wherein one yarn has water-blocking capabilities while the other yarn provides strength. Instead, a single yarn is provided by the present invention which contains both filaments of a water blocking fiber as well as filaments of a relatively strong polyester fiber. Due to the specific yarn blend disclosed herein, one strand of yarn now exhibits adequate water-blocking capabilities while also providing increased tensile strength selective to existing water-blocking materials.

Unlike the prior art, the present invention discloses a single yarn blend to be positioned immediately around the outer periphery of core wrap layer 28 and particularly drawn at having sufficient tensile strength to provide appreciable assistance in holding multiple communication media, such as insulated copper conductors, in a tight bundle.

As stated earlier, the main deficiency which exists in presently used water-blocking materials is a lack of adequate tensile strength to provide additional physical support for the various components of the communication cable. In order to obviate this deficiency, the present invention includes a single yarn blend of a fibrous strength members with a filaments of a superabsorbent fiber. In general, the fibrous strength member may be any of the known polyester materials with a relatively high tensile strength.

As used herein, polyester material refers to a manufactured fiber in which the fiber-forming substance is any long chain synthetic polymer composed of at least 85% by weight of an ester of dihydric alcohol and terephthalic acid. The polymer is produced by the reaction of ethylene glycol and terephthalic acid or its derivatives. In general, fiber forms produced are filament, staple and tow with the polymerization being accomplished at a high temperature, using a vacuum. The filaments may be spun in a melt-spinning process, then stretched several times their original length, which orients the long chain molecules and gives the fiber strength. Alternatively, another acceptable fibrous strength member is KEVLAR® yarn, a product which is available commercially from E.I. DuPont de Nemours. KEVLAR® is a DuPont trademark for a family of aramid fibers. Such fibrous material may be short fiber as well as continuous filament yarn. It has a relatively high tensile strength and its properties are reported in Information Bulletin K-506A dated June, 1980 and entitled "Properties and Uses of KEVLAR 29 and KEVLAR 49 In Electromechanical Cables and Fiber Optics". However, due to the relatively high cost of KEVLAR®, more affordable polyester fibers may be more desirable to achieve the required strength.

One particular fiber suitable for use as the water swellable or superabsorbent portion of yarns 42 and 44 is manufactured by Toyobo, Ltd. of Osaka, Japan, under the trade designation "Lanseal-F"® superabsorbent fiber and is available commercially from Chori America, Inc. Treated 5 denier×51 mm fibers which comprise a yarn of the preferred embodiment are characterized by a water absorbency in distilled water of 150 ml/g and in 0.9% NaCl solution of 50 ml/g. Water retentivity of such a fiber under weight for a 1% NaCl solution is 20 ml/g and its moisture content when shipped is no greater than 7%. Each fiber is characterized by a tensile strength (dry) of at least 1.6 g/d and an elongation (dry) of 15 to 25%. These properties appear in a bulletin entitled "Lanseal-F"® superabsorbent fiber.

The particular processing steps used to create the yarn blend of the present invention may be any of the well known methods known and used in the textile industry. In general, such processing operations include the following steps: carding, drawing, reducing, spinning single end winding, final winding and twisting. However, it should be noted that the specific method used to fabricate the yarn blend used in the present invention is not considered a particular point of novelty for this invention. Therefore, various steps may be added to or deleted from the processing method generally described above while yet still producing the yarn blend contemplated and covered under the present invention. In particular, the desired percentages of water-blocking fiber to strength fiber are accomplished in the drawing step which is listed second in the above textile processing method.

As noted earlier, the exact ratio of water-blocking fiber to strength fiber used in the yarn blend is a matter of design choice for the most part. However, it has been found that if approximately 30% or greater of the yarn blend is a polyester fiber, then the yarn blend exhibits handling characteristics commonly found in pure polyester yarns. Such handling characteristics allow for easier handling and processing of the yarn blend, as compared to yarns which are pure water-blocking fiber, or even a large majority water-blocking fiber.

Each yarn 42 and 44 must be characterized by other properties. For example, because the yarn is to be embodied in a cable, it is beneficial for the yarn to have a relatively high tensile strength. For the preferred embodiment each yarn has a tensile strength of about 12 lbs. To specifically determine an acceptable tensile strength for the preferred composition of the yarn blend, known binder tensions which produce enough core compression to prevent water penetration were identified. Then a conservative safety factor was added to avoid breaks from equipment or maintenance problems. Such terms indicated that a yarn blend consisting of approximately 70% Lanseal-F® fiber and approximately 30% polyester yarn provided the desired strength requirements and substantially exceeded the strength capabilities of existing water blocking yarns. It should be noted that the particular method of manufacturing the yarn blend commonly has a direct effect on the ultimate strength properties exhibited by the material.

Advantageously, in response to contact with water, the superabsorbent material in a cable structure swells to block the flow of water in a longitudinal direction. When the yarn is contacted by water, the water blocking portion of each fiber swells significantly by imbibing water. The superabsorbent material also forms a gel and changes the viscosity of the ingressed water at the point of contact with the superabsorbent material, making it more viscous and consequently developing more resistance to water flow. As a result, the flow of water longitudinally along a cable from a point of entry is reduced substantially.

It will be recalled that unlike some optical fiber cables, the cable 20 does not include separate strength members which extend helically or longitudinally along the cable so that a single helically extending yarn intercepts water at crossover points with the strength members. In order to intercept water which may flow along a channel formed by any one yarn, the cable 20 of this invention includes two water blockable yarns which due to their blend configuration also exhibit sufficient textile strength to assist in holding the core wrap binder 26 tightly around the communication media 24. Further, as is seen in FIGS. 1 and 3 the yarns 42 and 44 which in the present invention are identical in construction are wound helically in opposite directions about the plurality of communications media 24.

The water-blocking system in any given plane transverse of the longitudinal axis 21 of the cable extends about only an insubstantial portion of an inner periphery of the cable in that plane. There is substantially no increase in the diameter of the cable because of the presence of the yarns 42 and 44. Also, the yarns 42 and 44 are substantially less in cost than a system in which a strip of water-blocking material or atactic flooding material is used.

The water-blocking system 40 of the cable of this invention facilitates the extrusion of the inner jacket 28. Inasmuch as the use of an atactic material between the core wrap layer 26 and the inner jacket 28 has been eliminated and replaced by helically extending yarns which occupy a relatively small portion of the circumference, the inner jacket is extruded over a relatively smooth surface. As a result, the inner jacket has a relatively uniform thickness and does not exhibit protruding portions.

Figure 3:
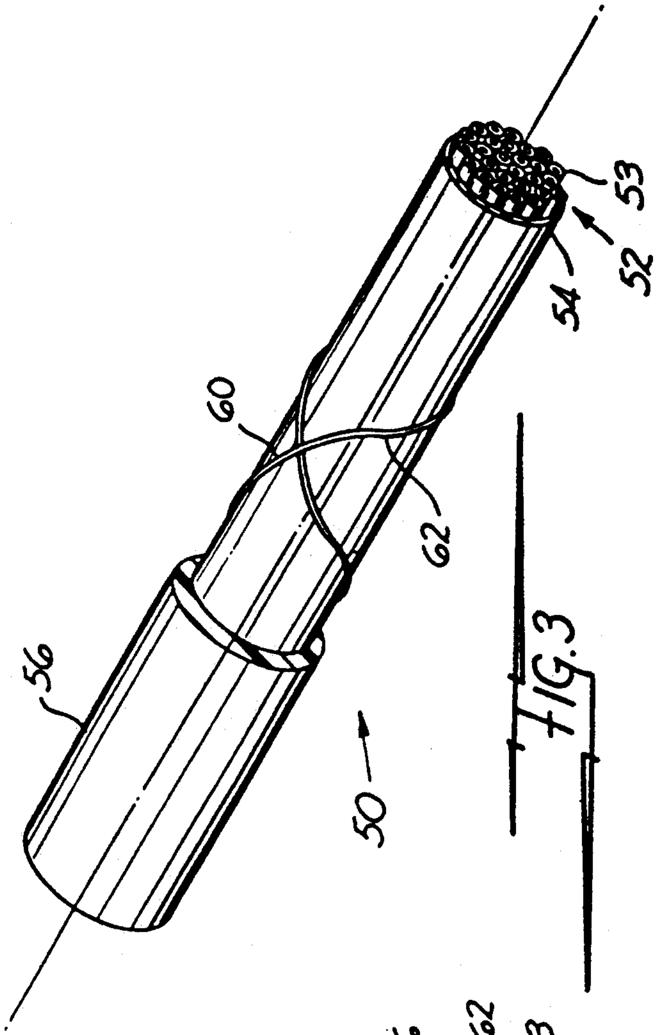
FIG. 3 is a perspective view of a cable which includes a core wrapped with a relatively supple plastic material, for example, and having yarns wrapped thereabout with a plastic jacket disposed about the yarns.
Figure 4:
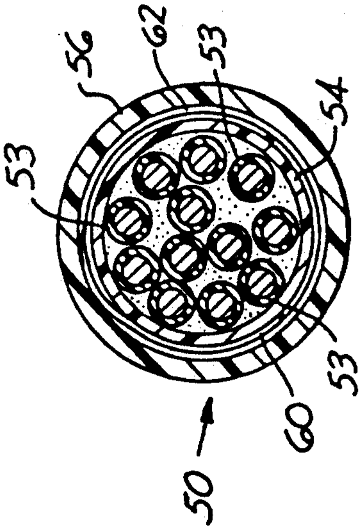
FIG. 4 is an end sectional view of the cable of FIG. 3.

Going now to FIGS. 3 and 4, there is shown a cable 50 which includes a core 52 which comprises one or more pairs of plastic insulated metallic conductors 53—53. The core 52 may be filled with a water-blocking material. A plastic core wrap layer 54 of a relatively flexible material has been wrapped about the core and a plastic jacket 56 which typically is comprised of polyethylene is disposed about the core wrap layer 54. Interposed between the core wrap layer 54 and the jacket 56 are two yarns 60 and 62 which extend in opposite helical directions about the core wrap layer. Each of the yarns may be identical to the yarns of the cable of FIG. 1 or may be comprised of a combination of yarns having suitable strength properties and of yarns having suitable water-blocking properties.

It is to be understood that the above-described arrangements are simply illustrative of the invention. Other arrangements may be devised by those skilled in the art which will embody the principles of the invention and fall within the spirit and scope thereof.

We claim:

1. A communications cable which comprises:

a core having a longitudinal axis and comprising at least one transmission medium;

a layer of a relatively supple plastic material which is disposed about said core;

a relatively rigid jacket which comprises a plastic material, which is disposed about said layer of plastic material and which is characterized by a relatively uniform thickness; and at least one longitudinally extending strand-like member which is disposed and wrapped helically about said layer of relatively supple plastic material and which is characterized by being a yarn blend comprising a portion of water blocking filaments and a portion of relatively high strength filaments, said portions purposely commingled to form a single strand of high strength water blocking yarn.

2. The cable of claim 1, wherein said strand-like member comprises a first strand and a second strand of the yarn blend which are disposed and wrapped helically in opposite directions about said layer of relatively supple plastic material.

3. The cable of claim 2, wherein a portion of said yarn blend is comprised of fibrous material which comprises acrylic fibers which have water-blocking capabilities.

4. The cable of claim 3, wherein said yarn blend includes a fiber portion comprised of polyacrylonitril which provides the yarn blend with a relatively high tensile strength.

5. The cable of claim 4, wherein each said yarn blend is constructed such that the majority portion is comprised of the water-blocking fiber and the remaining minority portion is comprised of strength enhancing polyester.

6. The cable of claim 5, wherein each yarn blend comprises approximately 70% water-blocking fiber and approximately 30% by weight strength enhancing polyester.

7. The cable of claim 1, wherein said jacket is an inner jacket and said cable also includes a first metallic shield which is disposed about said inner jacket;

a second metallic shield which is disposed about said first metallic shield;

an intermediate jacket which comprises a plastic material and which is disposed about said second metallic shield;

a third metallic shield which is disposed about said intermediate jacket; and an outer jacket which comprises a plastic material and which is disposed about said third metallic shield.

8. The cable of claim 1, wherein said relatively high strength filaments are polyester.

9. The cable of claim 1, wherein each of said water-blocking members has been wrapped about said layer of relatively supple plastic material in a manner characterized by about three turns per meter of cable length.

* * * * *